United States Patent
Mallary et al.

(10) Patent No.: US 6,567,229 B1
(45) Date of Patent: May 20, 2003

(54) AVOIDING ASPERITIES ON A STORAGE MEDIUM

(75) Inventors: Michael Mallary, Sterling, MA (US); Michael Leis, Framingham, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/324,349

(22) Filed: Jun. 2, 1999

(51) Int. Cl.⁷ .............................................. G11B 21/02
(52) U.S. Cl. ...................................................... 360/75
(58) Field of Search .................... 360/72.1, 75, 77.06, 360/77.07, 78.09, 77.03, 25, 31; 714/6; 369/33

(56) References Cited

U.S. PATENT DOCUMENTS

| | | | | |
|---|---|---|---|---|
| 4,914,530 A | * | 4/1990 | Graham et al. ................ | 360/48 |
| 5,768,226 A | * | 6/1998 | Ogino ...................... | 369/44.28 |
| 5,870,241 A | * | 2/1999 | Ottesen et al. ............ | 360/77.02 |
| 5,995,306 A | * | 11/1999 | Contreras et al. .............. | 360/31 |
| 6,201,655 B1 | * | 3/2001 | Watanabe et al. .............. | 360/53 |
| 6,411,458 B1 | * | 6/2002 | Billings et al. ................ | 360/75 |

OTHER PUBLICATIONS

LiHong Zhang and Ramesh Koka, "Lost dat: How a little dirt can do al lot of damage", pp15–20, Data Storage. Mar. 1999.

* cited by examiner

Primary Examiner—David Hudspeth
Assistant Examiner—Mitchell Slavitt
(74) Attorney, Agent, or Firm—David M. Sigmond

(57) ABSTRACT

Several ways of avoiding collisions between a transducer and asperities on the surface of a moving data storage medium are described. In general, information that indicates locations of the asperities on the surface is provided, and relative movement between the transducer and the surface is altered in response to the information. Approaches for altering the relative movement include preventing the transducer from idling over a track that contains an asperity or over a nearby track, and moving the transducer over an asperity-containing track before a read/write operation or away from the track after the read/write operation to avoid colliding with the asperity. In another technique, the transducer is temporarily moved away from the track as the asperity approaches during a data exchange, and is then returned to the track after the asperity passes. In yet another approach, the trajectory of the transducer during a seek operation between tracks is changed to avoid an asperity on an intermediate track or a destination track.

66 Claims, 5 Drawing Sheets

AVOIDING ASPERITIES ON A STORAGE MEDIUM

BACKGROUND

This invention relates to data storage devices.

One known data storage device is a magnetic disk drive, in which data stored on one or more rotatable storage media are read and/or written by corresponding transducers supported on "sliders." As the media rotate, the resulting air stream elevates the sliders, and hence the transducers, slightly from the media surfaces. The fly height is relatively small, however, and thus the transducers may collide with, and become damaged or destroyed by, asperities, i.e., surface defects, on the storage media.

SUMMARY

This invention features ways of avoiding collisions between a transducer and asperities on the surface of a data storage medium.

In a general aspect of the invention, information that indicates locations of the asperities on the surface of a moving data storage medium is provided, and relative movement between the transducer and the surface is altered in response to the information.

Preferred embodiments may include one or more of the following features.

In an idle mode of operation in which the transducer does not exchange data signals with the storage medium, the relative movement is altered by positioning the transducer over a portion of the surface that does not include an asperity during the movement of the storage medium. Preferably, the data are stored on tracks of the storage medium, and the information indicates a track on which an asperity is located. In the idle mode, the transducer is positioned over a track other than the indicated track, or a track nearby the indicated track.

Several ways of altering the movement are provided for a data exchange mode of operation in which the transducer is moved to a position over one of the tracks, performs a data exchange operation between the transducer and storage locations on the one track as the storage medium moves, and is thereafter moved away from the one track.

For example, if the track indicated by the information is the one track involved in the data exchange operation or is nearby that track, the transducer is moved over the one track or away from the one track to avoid colliding with the asperity. In one approach, the transducer is moved over the one track later than a nominal time before the data exchange operation is performed to avoid colliding with the asperity. Alternatively, the transducer is moved away from the one track earlier than a nominal time after the data exchange operation is performed to avoid colliding with the asperity. The relative movement between the transducer and the medium is altered differently if the data exchange operation is a read operation than if the data exchange operation is a write operation.

In another approach, the transducer is moved away from the one track as the asperity approaches the transducer, and then returned to the one track after the asperity passes the transducer. The amount of movement is sufficient to cause a selected region of the transducer to miss the asperity. For example, the transducer comprises a magnetoresistive element and adjacent magnet elements, and the selected region comprises the width defined by the magnetoresistive element and the magnet elements.

The relative movement between the transducer and the storage medium is also varied in response to the information in a seek mode of operation during which the transducer is moved from a position over a first one of the tracks along a selected trajectory to a position over a second one of the tracks as the storage medium moves. If the track indicated by the information is one that will be encountered by the transducer during the seek, the trajectory of the transducer is changed from the selected trajectory to avoid colliding with the asperity on the indicated track.

In one approach, the trajectory is changed by moving the transducer faster or slower than normal between the first and second tracks. For example, if the indicated track is between the first and second tracks, the trajectory is changed so that the transducer avoids the asperity as it crosses the indicated track. If the indicated track is the second track, the trajectory is changed so that the transducer arrives at the second track later than normal to avoid the asperity.

Preferably, the data storage medium moves by rotation. In one embodiment, the data storage medium and the transducer are magnetic devices. In another embodiment, the medium and the transducer are near field optical devices.

The data storage medium may have a second surface and a second transducer associated therewith, in which case the information indicates locations of the asperities on the second surface, and the relative movement between the second transducer and the second surface is altered in response to the information.

The data storage apparatus may include a plurality of moving storage media each of which has an associated transducer. The information indicates locations of the asperities on the surface of each one of the storage media, and the relative movement between the transducers and the surfaces are altered in response to the information. In embodiments in which the storage media move by rotation and data are stored on circular tracks thereof, corresponding tracks of the storage media define a cylinder, and the information indicates that a cylinder contains an asperity if any of the tracks thereof contain an asperity. Preferably, the relative movement of the transducers is altered in unison in response to the information to avoid an asperity in the cylinder.

The information is stored in a memory. The memory includes a record for each of the asperities that indicates the location thereof. In particular, each record indicates the track and sector on which the associated asperity is located. Each record may also store further information that indicates a characteristic (e.g., size or persistence) of the associated asperity. An output signal produced by the transducer is processed accordance with such further information.

A detector detects whether a change has occurred in one of the asperities and, if so, the corresponding record is updated in accordance with the change. The change includes, for example, an appearance of a new asperity, in which case a new record is created in the memory. If the detected change is the dissipation of a previously existing asperity, the corresponding record is deleted.

An asperity is detected by moving the transducer over the surface of the storage medium and determining the transducer collides with an asperity based on an output signal produced by the transducer.

Among other advantages, reducing collisions between the transducer and surface asperities reduces damage to the transducer that repeated collisions can cause. As a result, performance is enhanced, because noise that is often produced by a collision-damaged transducer is reduced. In addition, transducer operating lifetime is increased.

Other features and advantages of the invention will be apparent from the following detailed description, and from the claims.

DRAWINGS

DESCRIPTION OF EMBODIMENTS

Figure 1:
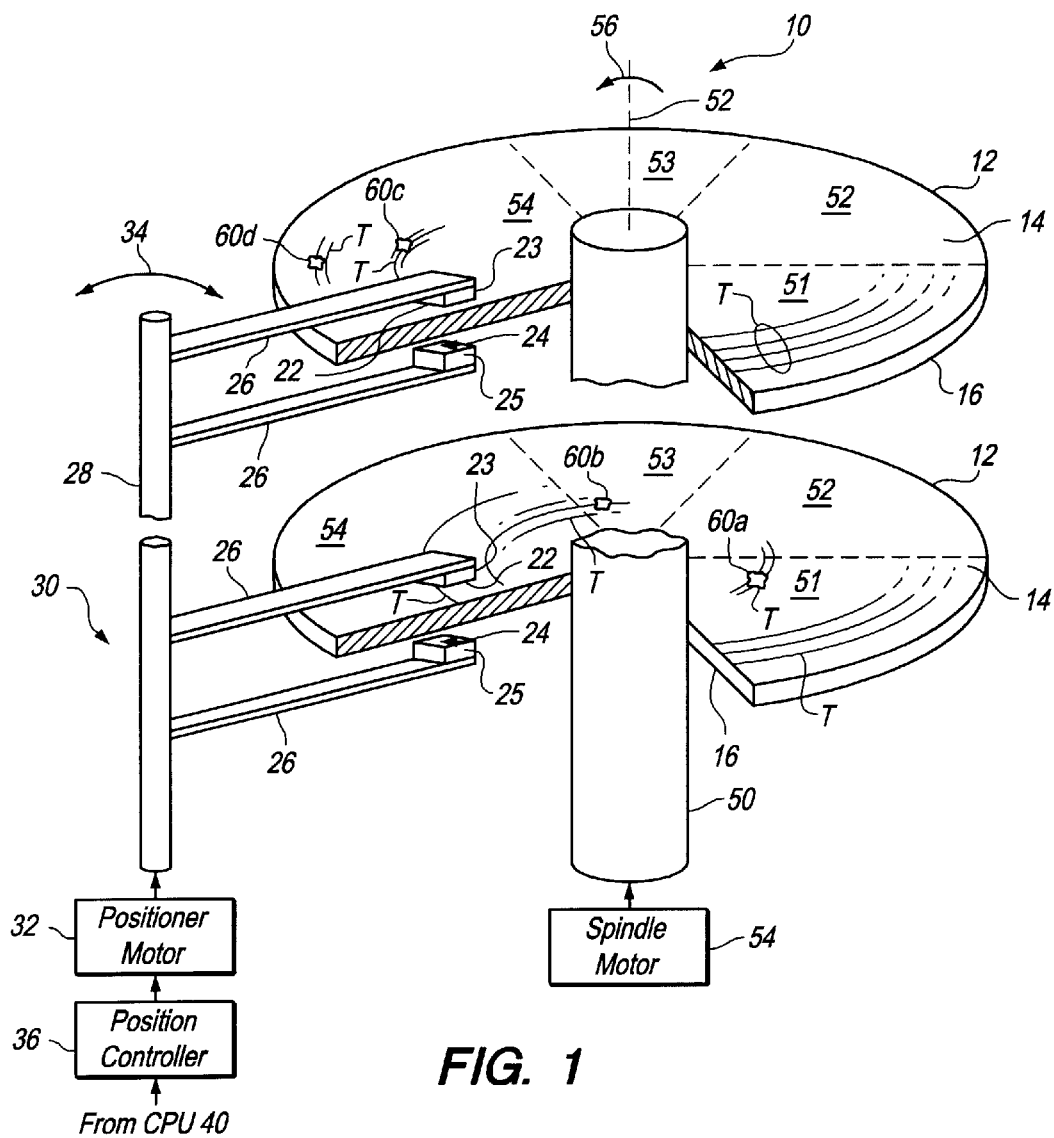
FIG. 1 shows a data storage apparatus in which one or more of the storage media have asperities on their surfaces.

Referring to FIG. 1, a disk drive 10 includes multiple data storage media 12 (only two of which are shown), each of which has upper and lower surfaces 14, 16 on which data is stored. Storage media 12 are magnetic disks and store the data at storage locations on multiple tracks T (only a few tracks on upper surface 14 of each medium 12 are shown). The tracks T of all surfaces 14, 16 on all media 12 that are located at the same radial position define a "cylinder" of data storage locations. Each surface 14, 16 is subdivided into sectors, only four of which, denoted as sectors S1–S4, are shown. Thus, in this example, each cylinder of data storage locations includes 4×N sectors S1–S4 of data storage locations (N being the number of disk surfaces 14, 16).

A pair of transducers 22, 24 are respectively associated with upper and lower surfaces 14, 16 of each storage medium 12 for interacting with the data storage locations on tracks T. The details of transducers 22, 24 are not shown in FIG. 1, but it will be understood that each transducer 22, 24 includes a magnetic write pole for writing data to the storage locations, and a magnetoresistive or giant magnetoresistive (MR) element (collectively called a "magnetoresistive" element herein) for reading data from the storage locations. Each transducer 22, 24 is mounted on a slider 23, 25 which is supported in a known manner at the free end of an arm 26. The opposite ends of arms 26 extend from a rotatable column 28 of a transducer positioner assembly 30. Arms 26 are all positioned at the same angular orientation with respect to column 28 so that, at any given time, positioner assembly arranges all transducers 22, 24, in the same cylinder and over the same location on surfaces 14, 16.

Transducers 22, 24 are moved across surfaces 14, 16 by a positioner motor 32, which rotates column 28 bidirectionally (as shown by arrow 34) in response to commands from a position controller 36. This operation is well known, but briefly, when a central processing unit (CPU) 40 (FIG. 3) determines that transducers 22, 24 are to be moved across surfaces 14, 16, it sends appropriate control signals to position controller 36, which operates positioner motor 32. As column 28 is rotated by positioner motor 32, it swings arms 26 together, thereby moving transducers 22, 24 in unison in an arc across surfaces 14, 16. In this way, controller 36 positions transducers 22, 24 together at a cylinder selected by CPU 40.

A hub 50 passes through the centers of storage media 12 along a vertical axis 52. A spindle motor 54 rotates hub 50, and hence storage media 12, about central axis 52 in the direction of arrow 56 (e.g., counterclockwise) at a high rate of speed (such as 7,200 rpm). The rapid rotation of surfaces 14, 16 induces air flow beneath sliders 23, 25, which respond by elevating transducers 22, 24 slightly from surfaces 14, 16 by a distance known as the "fly height." The data storage density of media 12 (that is, the number of storage locations that can exist on each track T) is inversely related to the fly height of transducers 22, 24. That is, as the data storage density on media 12 is increased, the fly height of transducers 22, 24 must be decreased (e.g., to as low as $1\times10^{-6}$ inch).

One danger presented by such low fly heights is the increased risk of collisions between transducers 22, 24 and asperities on surfaces 14, 16. An asperity is a defect on a surface 14, 16 that projects outwardly from the plane of the surface. An asperity 60 can be "hard" (meaning that the asperity is permanent) or "soft" (in that the asperity may dissipate over time). Four asperities (generally, 60) are shown on upper surfaces 14 in FIG. 1—asperities 60a, 60b in sectors S1 and S3 of lower medium 12, and asperities 60c, 60d in sector S4 of upper medium 12. It will be understood that more (or fewer) asperities 60 may exist on surfaces 14, and that asperities 60 may also be present on one or both lower surfaces 16.

Data may not be recorded at storage locations occupied by a hard asperity 60 if the asperity is detected during the manufacturing process. Nevertheless, during operation of the disk drive, transducers 22, 24 may collide with asperities 60 for a number of reasons. For example, collisions may occur when transducers 22, 24 try to access nearby data, or with asperities that are created by debris after manufacture, or if data is written in asperity-containing regions despite the presence of asperities, or during idling by transducers 22, 24 on or near asperity-containing cylinders.

During an idle operation, position controller 36 places transducers 22, 24 in a cylinder (over a common track T of all media 12) according to an idle routine. If one of the surfaces 14, 16 contains an asperity 60 on the common track T, the transducer 22, 24 associated with that surface 14, 16 will repeatedly collide with asperity 60. Collisions with asperities 60 may also occur when transducers 22, 24 are positioned over tracks T for reading and writing, or are moved from one track T to another in a "seek" operation. Such collisions can damage or even destroy transducers 22, 24.

Figure 2:
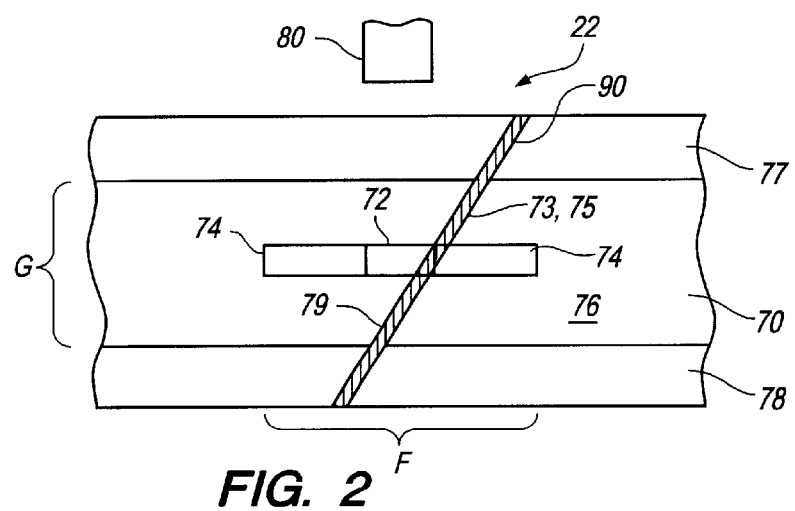
FIG. 2 illustrates damage to the air bearing surface of a transducer caused by a collision with an asperity.

FIG. 2 illustrates the air-bearing surface 70 (i.e., the surface that faces a storage medium 12) of one of the transducers 22, 24 (e.g., transducer 22). An MR element 72 and a pair of permanent magnet elements 74 that straddle MR element 72 are embedded in an insulating layer 76. MR element 72 is positioned transversely to the orientation of tracks T, and the distance spanned by MR element 72 defines the active width of the MR portion of transducer 22. A corresponding fragile region F of the transducer is defined by the distance spanned by MR element 72 and magnetic elements 74. As explained below, it is fragile region F that is the most susceptible to damage caused by asperity collisions.

A pair of magnetic shields 77, 78 are disposed on opposite sides of insulating layer 76, and the spacing therebetween defines a gap G. A write pole 80 is positioned on the side of shield 77 opposite to MR element 72. Write pole 80 is far less fragile than MR element 72 and thus is less prone to damage from asperity collisions.

If transducer 22 collides with an asperity 60 (particularly a hard asperity), the impact or impacts produces a gouge 90 across air bearing surface 70. (Of course, impacts with multiple asperities produce a like number of gouges, but only a single gouge 90 is shown in FIG. 2 for simplicity.) As a result, shield material 79, MR element material 73, and magnetic element material 75 (or various combinations of these materials), may become smeared across gap G. This material 73, 75, 79 may produce a short circuit across gap G, thereby degrading the electrical signal induced in MR element 72 during reading and reducing the signal-to-noise ratio of the signal. If a sufficient number of gouges are made by asperity collisions, transducer 22 may fail entirely. Such failure occurs when a large fraction of the transducer current is short circuited through shields 77, 78, or if collisions erode the transducer structure sufficiently that the spacing between the transducer and the media is increased by a large fraction of the fly height.

Figure 3:
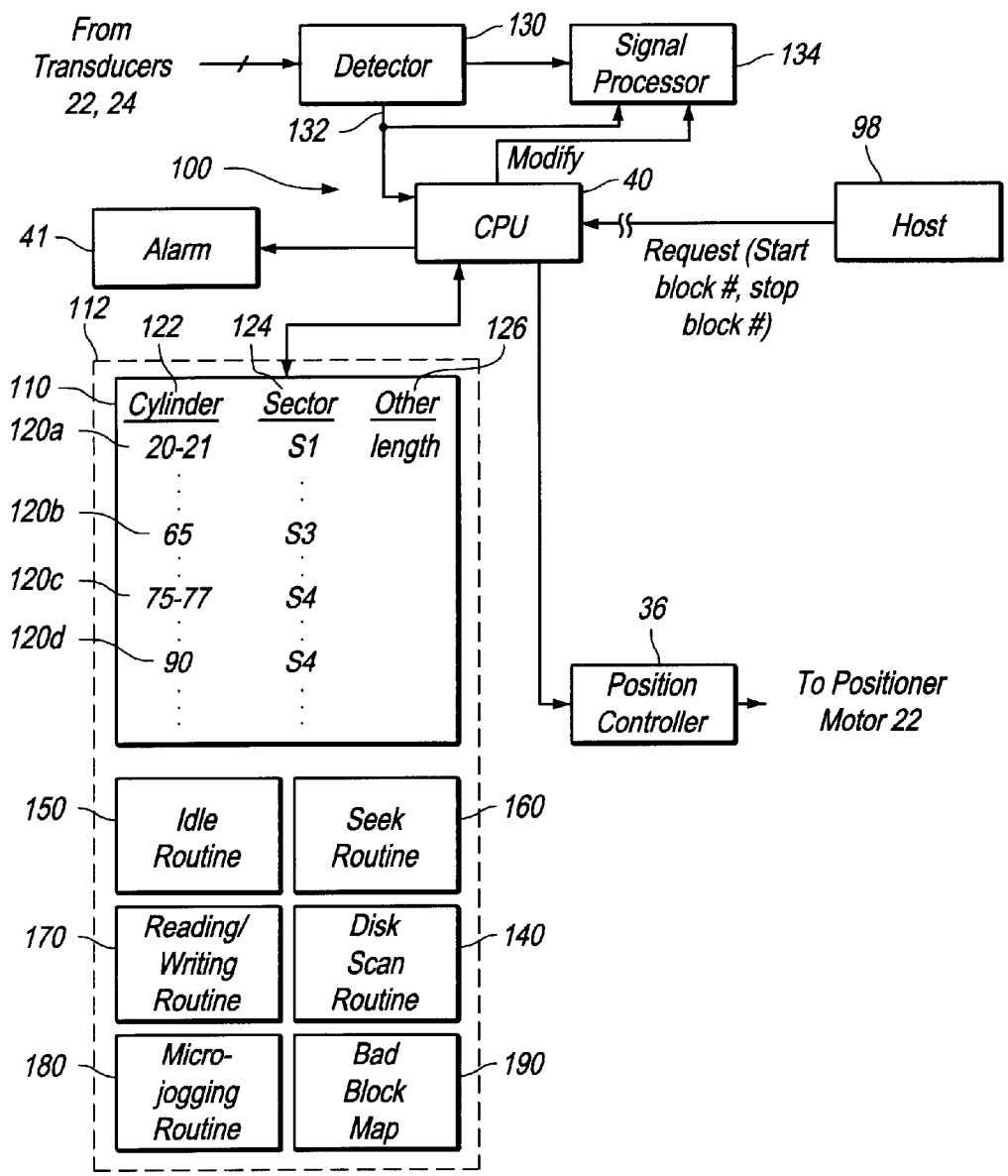
FIG. 3 is a block diagram of an asperity avoidance system.

FIG. 3 shows disk drive electronics 100, which include CPU 40. CPU 40 responds to requests from an external host processor 98 by performing read and write operations at storage locations on media 12 indicated in the request. Disk drive electronics 100 also include several features (e.g., software or firmware routines executed by CPU 40) for avoiding collisions between transducers 22, 24 and asperities 60 during the operation of drive 10. In particular, CPU 40 maintains an asperity map 110 in memory 112, and uses map 110 to alter the relative movement of transducers 22, 24 as necessary to avoid collisions with asperities 60. Map 110 includes records (generally, 120) for all asperities 60 that have been detected (in a manner described below) on storage media surfaces 14, 16. Each record 120 includes entries 122, 124 that respectively identify the cylinder (or cylinders) and sector at which the asperity 60 is located. Thus, each record uniquely identifies the location of its asperity 60 in the data storage volume of disk drive 10.

Referring also to FIG. 1, records 120a, 120b respectively correspond to asperities 60a, 60b on surface 14 of lower medium 12. Asperity 60a spans two tracks T, e.g, tracks 20–21, and thus entry 122 of record 120a identifies cylinders 20–21, while entry 124 identifies sector S1. Asperity 60b lies on only track 65 in sector S3, and thus entries 122, 124 of record 120b identify cylinder 65 and sector S3, respectively. Similarly, record 120c defines the location of asperity 60c as cylinders 75–77 (corresponding to the three tracks T occupied by asperity 60c) in sector S4, and record 120d defines the location of asperity 60d as cylinder 90 (entry 122) and sector S4 (entry 124).

Each record 120 also includes one or more other entries 126 at which other information relevant to the asperity 60 is stored. For example, entries 126 may identify the length or other characteristics of the corresponding asperities, detected as described below. Other information that may be included in entries 126 are the position of the asperity in the sector, and the time history behavior of transducer signal amplitude during collisions. This history information indicates the persistence of the asperity, which is a measure of the asperity's hardness. An amplitude that decreases with time indicates that the asperity is not persistent, and accordingly CPU 40 may remove the asperity from map 110 if the amplitude decreases sufficiently. Alternatively, if the history information indicates that the asperity is getting worse, CPU 40 may trigger an alarm 41 to signal potential drive failure. CPU 40 may also use the recorded asperity characteristics to aid in data recovery (e.g., to correct signal distortion associated with the asperity).

It will be appreciated that although map 110 is shown as containing only four records 120a–120d, map 110 may store as many records as there are asperities 60 on storage media 12. Also, records 120 need not be organized by ascending cylinder number, as are records 120a–120d. Typically, records 120 will appear in map 110 in the order in which they are detected, but an additional table pointer ordered by cylinder number may be provided to reduce the access time needed by CPU 40 to find the relevant entry or records 120 in map 110.

Figure 4:
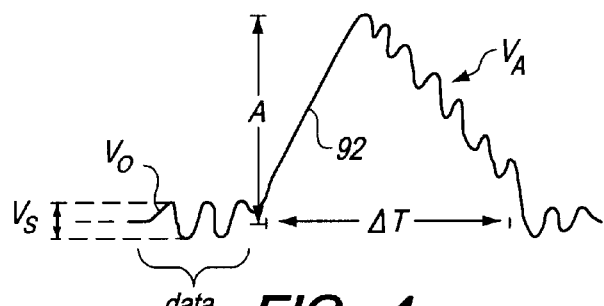
FIG. 4 depicts a spike in a transducer's output signal produced in response to a collision with an asperity.

Referring to FIGS. 3 and 4, the procedure for detecting asperities and creating a corresponding record 120 in map 110 will now be described. When transducer 22, 24 collides with an asperity 60, the collision causes a spike 92 in the output voltage ($V_o$) produced by MR element 72. The duration ($\Delta T$) and amplitude (A) of spike 92 provides useful information about the asperity. For example, duration $\Delta T$ indicates the length of the asperity on the track, and amplitude A represents the height of the asperity. During the time ($\Delta T$) for which the asperity distortion voltage ($V_A$) is a significant fraction of the data signal voltage ($V_S$), the maximum value A of $V_A$ can be used to correct the read back signal ($V_O$). In addition, amplitude A is used to provide the persistence information on the asperity in map 110.

The outputs of transducers 22, 24 are applied to an asperity detector 130, which uses filtering to detect each spike 92 and generate signals 132 representative of duration $\Delta T$ and amplitude A. Detector 130 applies signals 132 to a signal processor 134, which applies correction to $V_O$. according to known techniques to recover the data.

Detector 130 also sends signal 132 to CPU 40, which responds by determining the cylinder and sector at which the asperity is located based on the known position of transducers 22, 24 at the moment that the asperity is detected. CPU 40 then consults map 110 to determine whether map 110 already includes a record 120 for the asperity. If not, CPU 40 creates a new record, inserting the cylinder and sector information in entries 122, 124. If a record 120 already exists, CPU 40 determines whether record 120 should be updated based on the information contained in signal 132, and if so, modifies the record accordingly. In addition, CPU 40 may store information about the length and persistence of the asperity in entry 126, based on the width ($\Delta T$), amplitude (A), and history of a spike 92 produced by a collision with the asperity.

CPU 40 constructs asperity map 110 by executing a disk scan routine 140 stored in memory 112. Disk scan routine 140 is performed, e.g., during the drive manufacturing self-test "burn in" period of disk drive 10. Under the control of disk scan routine 140, CPU 40 instructs position controller 36 to move transducers 22, 24 across surfaces 14, 16 in a predetermined manner, and monitors the output of detector 130 as transducers 22, 24 are so moved.

For example, position controller 36 initially moves transducers 22, 24 to the innermost track T (i.e., the innermost cylinder in the data storage volume), and CPU 40 monitors the output of detector 130. When any of the transducers 22, 24 collides with an asperity 60, detector 130 produces a signal 132 corresponding to the characteristics of a spike 92 (FIG. 4), and CPU 40 creates a record 120 in map 110 as described above. When the first track has been fully scanned, position controller 36 moves transducers 22, 24 radially outwardly to the adjacent track T, and the process is repeated until all tracks T (cylinders) have been scanned.

CPU 40 may also execute scan disk routine 140 at regular maintenance intervals during idle periods to detect asperities 60 which may have formed since startup (caused, e.g., by debris in the drive), or conversely to determine whether a previously detected asperity 60 is no longer producing collisions (e.g., because the asperity has been burnished by previous collisions with a slider 23, 25). If so, CPU 40 updates map 110 by adding or deleting a record 120, as the case may be. CPU 40 may also add, delete, or modify information in entry 126 to indicate changes in the corresponding asperity over time (e.g., as reflected by changes the amplitude (A) or duration (ΔT) of spike 92).

During the operation of disk drive 10, CPU 40 executes several software or firmware routines stored in memory 112 (alternatively, the routines may be stored in another memory) to alter the relative movement between transducers 22, 24 and storage media surfaces 14, 16 using the information in map 110 to avoid collisions with asperities. These routines are described in detail below, but briefly, they include:

(1) an "idle" routine 150 which ensures that transducers 22, 24 are not idled in or near a cylinder (i.e., over a track) that contains an asperity;

(2) a "seek" routine 160 which alters the trajectory of transducers 22, 24 as they are moved between cylinders to avoid collisions with asperities contained on tracks in intermediate cylinders or on a track in the destination cylinder;

(3) read/write routine 170 which moves transducers 22, 24 away from a cylinder after a read or write operation earlier than normal to avoid an oncoming asperity, or moves transducers 22, 24 onto a cylinder later than normal before a read or write operation to avoid an asperity;

(4) a "microjogging" routine 180 which temporarily shifts transducers 22, 24 away from a cylinder that contains an asperity to an adjacent cylinder as the asperity is approached, and then returns transducers 22, 24 to the initial cylinder when the asperity passes.

Figure 5:
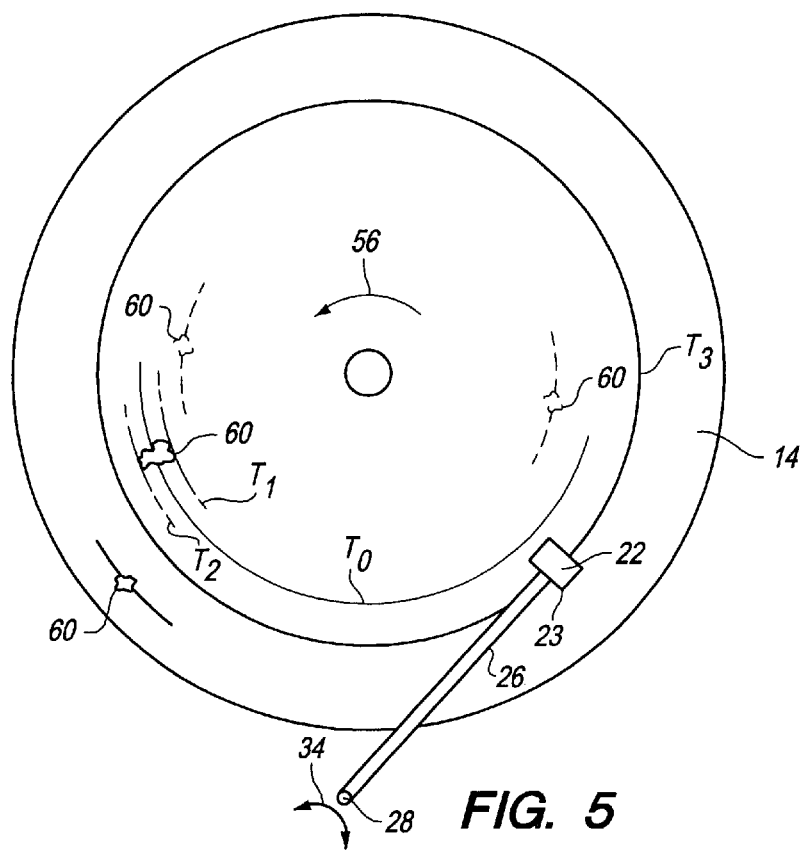
FIGS. 5–8 are useful in understanding various ways in which the asperity avoidance system avoids collisions with asperities.

FIG. 5 illustrates the operation of idle routine 150. CPU 40 enters idle routine 150 whenever host 98 (FIG. 3) is not providing read or write requests. In a normal idle routine, CPU 40 designates a cylinder to which transducers 22, 24 will be moved, based on such factors as accessibility to other cylinders (e.g., when flying over a given track a transducer can access both the inwardly and outwardly adjacent tracks equally rapidly) and excess residence time at any particular cylinder (e.g., to change the idle cylinder from cylinder N to cylinder N+1, to cylinder N+2, etc. over time). Then, CPU 40 instructs head positioner 36 to move transducers 22, 24 to that cylinder.

In addition to (or instead of) the factors noted above, idle routine 150 causes CPU 40 to consult asperity map 110 to determine whether a cylinder which would normally be selected for idling includes a track that contains an asperity or is nearby such a cylinder. By "nearby" we mean sufficiently close to the cylinder having an asperity-containing track that the asperity would collide with the fragile region F (FIG. 2) of one of transducers 22. Thus, nearby tracks are within a distance of +/− the width of fragile region F from the asperity-containing track (plus a safety margin of a few tracks). If a cylinder which would normally be selected for idling includes a track that contains an asperity or is nearby such a cylinder, CPU 40 selects another cylinder whose tracks do not contain an asperity and which is sufficiently spaced from the nearby cylinder that the asperity does not collide with the transducer (or, at a minimum, does not collide with fragile region F of the transducer).

For example, assume a cylinder that includes track $T_0$ (or is nearby a cylinder containing track $T_0$) would normally be selected for idling. CPU 40 checks map 110 and determines that the cylinder (as well as adjacent cylinders that include tracks $T_1$ and $T_2$) contains an asperity 60. CPU 40 also determines from map 110 that another cylinder, which includes track $T_3$, does not contain an asperity and is not nearby the cylinders containing tracks $T_0$, $T_1$, and $T_2$. This latter determination is made by determining that map 110 contains no records 120 that designate the cylinder corresponding to track $T_3$ in entry 122. Accordingly, CPU 40 instructs position controller 36 to move transducers 22, 24 to the cylinder containing asperity-free track $T_3$.

Figure 6A:
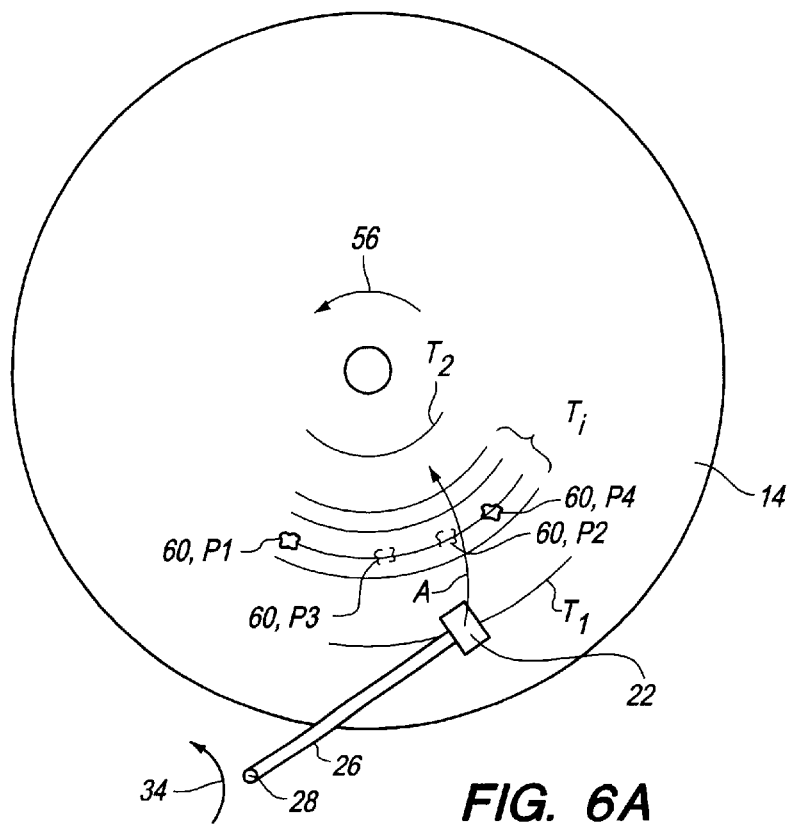

FIG. 6A shows one way in which seek routine 160 avoids asperity collisions during a seek operation. A seek operation involves moving the transducers 22, 24 (only one of which is shown) from one track, $T_1$, to another track, $T_2$, typically across one or more intermediate tracks, $T_i$. In a normal seek routine, CPU 40 instructs transducer positioner 36 to move arm 26 at a nominal speed across an arc A between tracks $T_1$ and $T_2$. Transducer positioner 36 responds by applying an appropriate control signal pulse to positioner motor 32, which in turn rotates arms 26 at the desired speed.

Seek routine 160 modifies this procedure by causing CPU 40 to consult map 110 and determine whether any of the cylinders that include intermediate tracks $T_i$ contain an asperity 60. If so, CPU 40 determines, based on the current position of transducer 22 over surface 14 (as determined from data header signals and servo bursts on the disks), the location or locations (i.e., cylinder and sector) of the asperity or asperities on the intermediate tracks $T_i$, and the known rotational velocity of media 12, whether the trajectory of transducer 22 during the seek operation needs to be modified to avoid the asperity or asperities.

For example, assume that CPU 40 determines from map 110 that one of the intermediate tracks $T_i$ contains an asperity 60, and calculates that, based on the location of asperity 60 (P1) relative to transducer 22 at the start of the seek operation, transducer 22 will collide with asperity 60 at position P2 if the transducer is moved at the nominal speed between tracks $T_1$ and $T_2$. To avoid the collision, CPU 40 directs transducer positioner 36 to move transducer 22 across intermediate tracks $T_i$ either faster or slower than the nominal speed, so that asperity 60 crosses the path of arc A either after or before transducer 22 intercepts the track that contains asperity 60. If transducer positioner 36 causes positioner motor 32 to move arms 26 faster than the nominal speed, transducer 22 will cross the asperity-containing track when asperity 60 is in position P3 (i.e., before the asperity reaches the path of arc A). If, on the other hand, CPU 40 causes the seek trajectory to change so that positioner motor 32 moves arms 26 more slowly than the nominal speed, transducer 22 will cross the asperity-containing track when asperity 60 is in position P4 (i.e., after the asperity has passed the path of arc A).

Figure 6B:
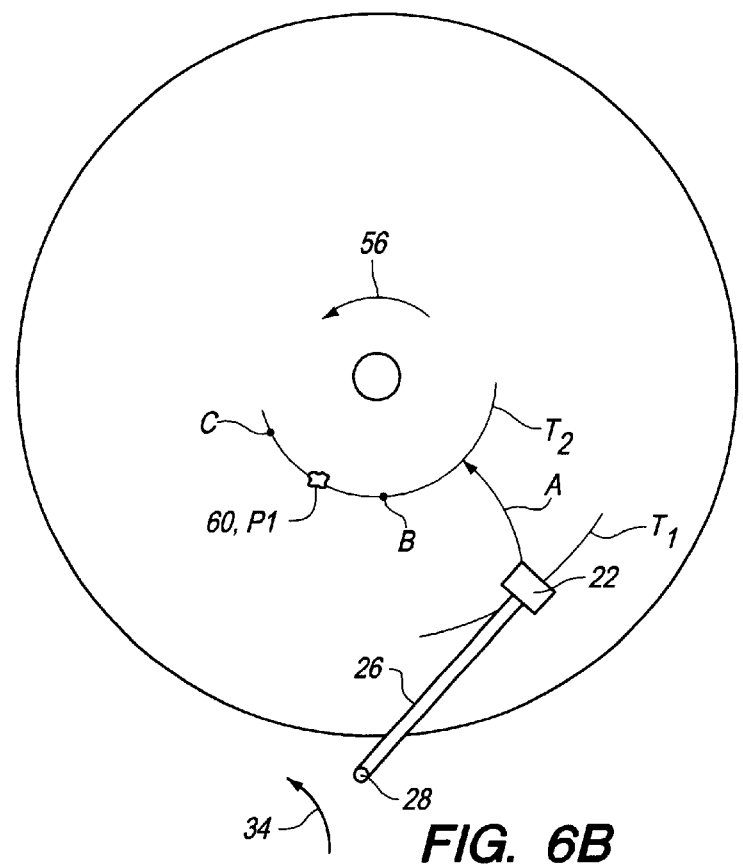

Referring to FIG. 6B, another way in which CPU 40 alters the trajectory of transducer 22 during a seek routine using the information in asperity map 110 is shown. In this example, CPU 40 determines from map 110 that an asperity 60 lies on the destination track, $T_2$ of the seek operation. CPU 40 further calculates that, based on the location of asperity 60 (P1) relative to transducer 22 at the start of the seek operation, transducer 22 will arrive at point B of track $T_2$ if the transducer is moved at the nominal speed between tracks $T_1$ and $T_2$. This would result in a collision with asperity 60, because point B lies ahead of asperity 60 on track $T_2$. To avoid the collision, CPU 40 instructs transducer positioner 36 to cause positioner motor 32 to move arms 26 more slowly than the nominal speed, so that transducer 22 arrives at track $T_2$ over point C—behind the asperity. Thus, asperity 60 will have already passed the path of arc A by the time transducer 22 arrives.

CPU 40 executes read/write routine 170 (FIG. 3) in response to a request from host 98 to either read data from or write data to storage media 12. Each request contains a start block number and a stop block number, which respectively indicate the storage locations at which the read/write operation is to begin and end.

Figure 7A:
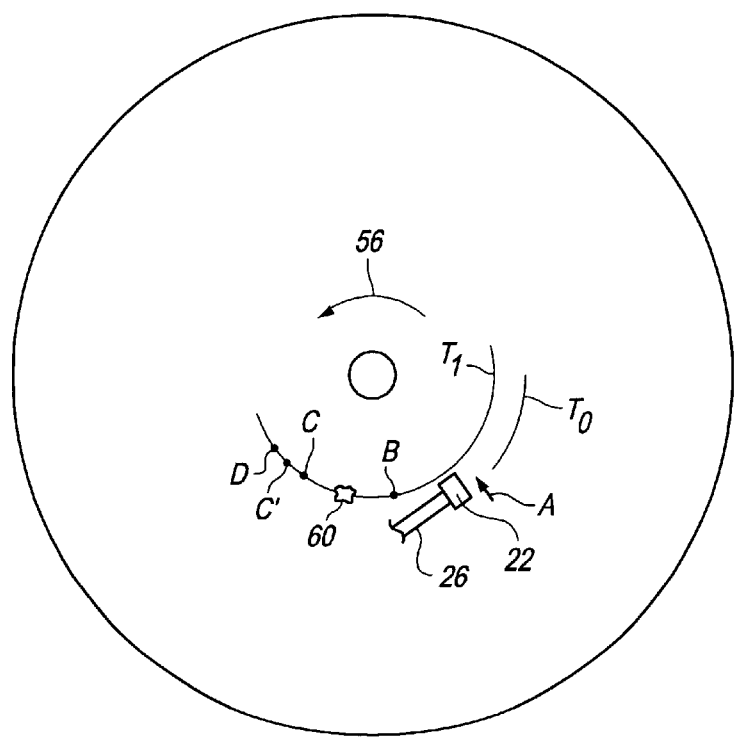

Referring to FIG. 7A, in a normal read/write routine, CPU 40 moves transducer 22 (by controlling head positioner 36 and positioner motor 32 as described above) from a given track $T_0$ to the track $T_1$ on which the read or write is to be performed. Typically, CPU 40 ensures that transducer 22 arrives at a point B located a predetermined distance ahead of the storage location D at which reading or writing is to commence. This gives transducer 22 sufficient time to become synchronized over the track and settled onto the track before beginning the read or write operation.

If, however, CPU 40 determines from map 110 that an asperity 60 lies between points B and D (based on the information in record entry 126 regarding the position of the asperity in the sector), either on track $T_1$ or on a nearby track, it suitably controls positioner 36 to delay the arrival of transducer 22 at track $T_1$ so that transducer 22 enters the track at a point C located behind asperity 60 but ahead of point D by a sufficient amount to provide transducer 22 with sufficient time to become synchronized and settled before reaching point D. The amount of settling time needed is often longer for a write operation than for a read operation. Thus, if a read is to be performed, CPU 40 may introduce more delay so that transducer 22 arrives on track $T_1$ at point C'. This provides an additional margin of error in avoiding asperity 60.

CPU 40 may combine the delayed arrival operation shown in FIG. 7A with the modification to the seek procedure discussed above. For example, settling time increases with seek distance. Thus, in order to provide sufficient settling time before transducer 22 reaches point B, CPU 40 may perform the seek in two steps. In the first step, transducer 22 is moved to an intermediate track that is just outside the "nearby" zone associated with asperity containing track $T_1$. Then, CPU 40 moves transducer 22 onto track $T_1$ at point C or point C', as the case may be.

Figure 7B:
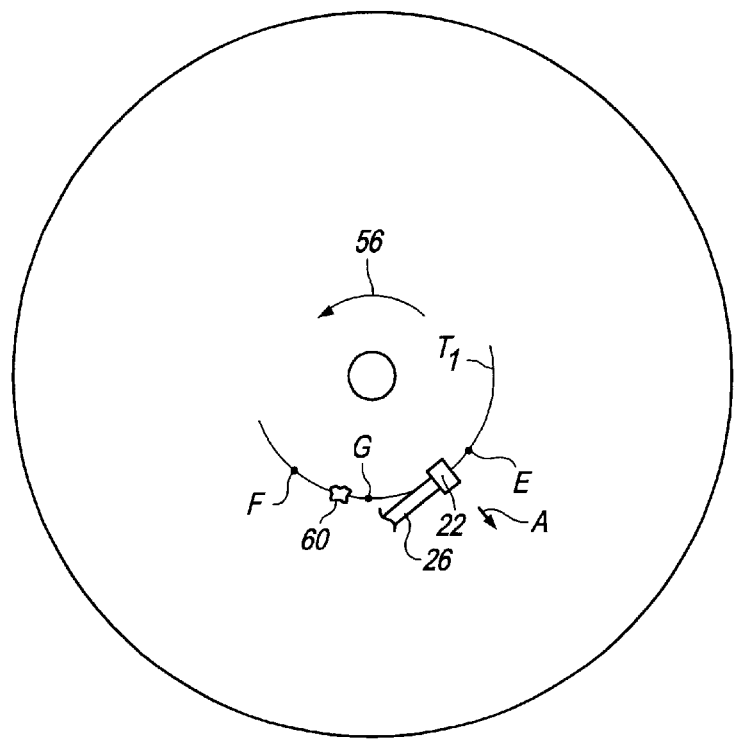

FIG. 7B illustrates another way in which reading/writing routine 170 allows CPU 40 to avoid asperity collisions using the information in map 110. Normally, CPU 40 maintains transducer 22 over a track $T_1$ for a predetermined time interval after a read or write operation is completed (at storage location E), unless CPU 40 receives another request from host 98. That is, unless CPU 40 receives such a request, it does not move transducer 22 away from track $T_1$ until a sufficient time has elapsed to invoke idle routine 150. But if CPU 40 finds from map 110 that an asperity 60 lies between points E and F on track $T_1$ or on a nearby track, CPU 40 directs positioner 36 to move transducer 22 away from track $T_1$ after a shorter time delay (i.e., earlier than normal). For example, CPU 40 causes transducer 22 to be moved off of track $T_1$ by the time point G, which lies ahead of asperity 60, reaches transducer 22.

Asperities 60 typically are unsuitable for reliably storing data. CPU 40 maintains a "bad block" map 190 in memory 112, the contents of which are based on the information in asperity map 110, and skips over the bad blocks during reading and writing. In addition, if the asperity occupies multiple cylinders (as does asperity 60a identified by record 120a in map 110), CPU 40 also marks as bad corresponding blocks of storage locations in those cylinders.

Figure 8:
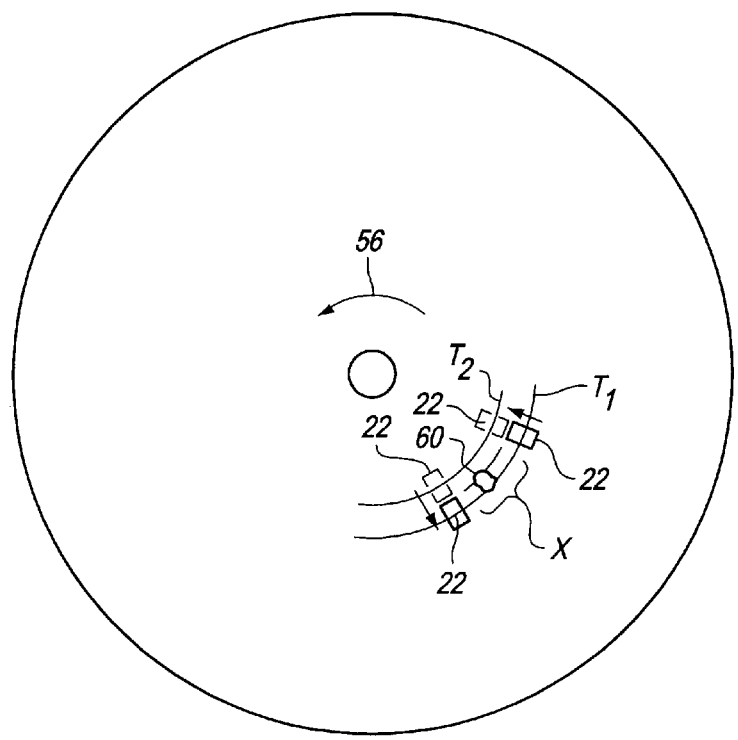

Referring to FIG. 8, "microjogging" routine 180 provides a way of avoiding collisions with an asperity in a bad block X on track $T_1$. CPU 40 temporarily moves transducer 22 to another track that is not nearby track $T_1$ (e.g., track $T_2$) as bad block X is approached, and then returns transducer 22 to track $T_1$ after bad block X passes. Because of the rapid rotation of storage media 12, and the typically small size of asperity 60, transducer 22 rapidly "jogs" around asperity 60. CPU 40 selects track $T_2$ to avoid a collision with another asperity (either on or nearby track $T_2$ or on an intermediate track).

The number of tracks that transducer 22 is moved away from track $T_1$ to avoid colliding with the asperity on track $T_1$ is a function of the number of cylinders that contain the asperity (indicated by entry 122 in the corresponding record 120 of map 110), the track spacing, and the size of the transducer fragile region F (FIG. 2). However, the width of the fragile region F (e.g, about 15 microns) is generally much larger than an asperity (which is typically about 1 micron wide). Thus, most asperities can safely be avoided by moving transducer 22 off of track $T_1$ by one-half of the width of fragile region F (i.e., by 7.5 microns), plus a safety margin of a few tracks. This is the same margin of error that is used, e.g., by idle routine 150 in determining the correct cylinder in which to idle.

Other embodiments are within the scope of the following claims.

For example, the information in asperity map 110 can be used in additional ways. In instances in which a collision cannot be avoided, CPU 40 can warn signal processor 134 (FIG. 3) that a collision is imminent, and instruct signal processor 134 to modify its processing procedure to compensate for variations (e.g., spike 92, FIG. 4) caused by the asperity. CPU 40 may determine how the processing should be modified based on information about the size of the asperity indicated by information in corresponding entry 126 of map 110.

The asperity map and collision avoidance techniques may also be used with other kinds of storage media and transducers, such as optical media and near field optical transducers. The media can move in other ways (e.g., linearly, as in tape drives).

What is claimed is:

1. A method of avoiding collisions between asperities on a surface of a moving data storage medium and a transducer that exchanges data signals with the storage medium and is movable over the surface during the movement of the storage medium, wherein data are stored on tracks of the storage medium, comprising:

providing information that indicates locations of the asperities on the surface;

altering relative movement between the transducer and the surface in response to the information; and exchanging data signals between the transducer and one of the tracks while the providing information indicates an asperity is located on the one track.

2. The method of claim 1 further comprising providing an idle mode of operation in which the transducer does not exchange data signals with the storage medium, said altering comprising positioning the transducer over a portion of the surface that does not include an asperity during the movement of the storage medium in the idle mode.

3. The method of claim 2 wherein said providing information indicates a track on which an asperity is located, and said altering comprises positioning the transducer over a track other than the indicated track or a track nearby the indicated track.

4. A method of avoiding collisions between asperities on a surface of a moving data storage medium and a transducer that exchanges data signals with the storage medium and is movable over the surface during the movement of the storage medium, wherein data are stored on tracks of the storage medium, comprising:

provilding information that indicates locations of the asperities on the surface;

altering relative movement between the transducer and the surface in response to the information;

providing a data exchange mode of operation that includes moving the transducer to a position over one of the tracks, performing a data exchange operation between the transducer and storage locations on the one track as the storage medium moves, and thereafter moving the transducer away from the one track;

said providing information comprising indicating a track on which an asperity is located; and if the indicated track is said one track, said altering comprising moving the transducer over the one track or away from the one track to avoid colliding with the asperity.

5. The method of claim 4 wherein said altering comprises moving the transducer over the one track later than a nominal time before the data exchange operation is performed to avoid colliding with the asperity.

6. The method of claim 4 wherein said altering comprises moving the transducer away from the one track earlier than a nominal time after the data exchange operation is performed to avoid colliding with the asperity.

7. The method of claim 4 further comprising performing said altering differently if the data exchange operation is a read operation than if the data exchange operation is a write operation.

8. A method of avoiding collisions between asperities on a surface of a moving data storage medium and a transducer that exchanges data signals with the storage medium and is movable over the surface during the movement of the storage medium, wherein data are stored on tracks of the storage medium, comprising:

providing information that indicates locations of the asperities on the surface;

altering relative movement between the transducer and the surface in response to the information;

providing a data exchange mode of operation that includes performing a data exchange operation between the transducer and storage locations on one of the tracks as the storage medium moves;

said providing information further comprising indicating a track on which an asperity is located; and if the indicated track is the one track or is nearby the one track, said altering comprising moving the transducer away from the one track as the asperity approaches the transducer, and then returning the transducer to the one track after the asperity passes the transducer.

9. The method of claim 8 wherein moving comprises moving the transducer sufficiently to cause a selected region of the transducer to miss the asperity.

10. The method of claim 9 wherein the transducer includes a magnetoresistive element and adjacent magnet elements, the selected region comprising a width defined by the magnetoresistive element and the magnet elements.

11. A method of avoiding collisions between asperities on a surface of a moving data storage medium and a transducer that exchanges data signals with the storage medium and is movable over the surface during the movement of the storage medium, wherein data are stored on tracks of the storage medium, comprising:

providing information that indicates locations of the asperities on the surface;

altering relative movement between the transducer and the surface in response to the information;

providing a seek mode of operation that includes moving the transducer from a position over a first one of the tracks along a selected trajectory to a position over a second one of the tracks as the storage medium moves;

said providing information further comprising indicating a track on which an asperity is located; and if the indicated track is one that will be encountered by the transducer during the seek, said altering comprising changing the trajectory of the transducer from the selected trajectory to avoid colliding with the asperity on the indicated track, wherein said altering changes the trajectory by moving the transducer faster or slower than normal between the first and second tracks.

12. The method of claim 11 wherein said altering changes the trajectory by moving the transducer faster than normal between the first and second tracks.

13. The method of claim 11 wherein, if the indicated track is between the first and second tracks, said altering comprising changing the trajectory so that the transducer avoids the asperity as it crosses the indicated track.

14. The method of claim 11 wherein, if the indicated track is the second track, said altering comprising changing the trajectory so that the transducer arrives at the second track later than normal to avoid the asperity.

15. The method of claim 1 wherein the data storage medium moves by rotation.

16. The method of claim 1 wherein the data storage medium is a magnetic storage medium and the transducer is a magnetic device.

17. The method of claim 1 wherein the data storage medium is an optical storage medium and the transducer is a near field optical device.

18. The method of claim 1 wherein the data storage medium has a second said surface and a second said transducer associated therewith, said providing information including indicating locations of the asperities on the second surface, and said altering including altering relative movement between the second transducer and the second surface in response to the information.

19. The method of claim 1 for use with a plurality of moving storage media each of which has associated therewith a said transducer that exchanges data signals therewith and is movable with respect to the surface during the movement of the storage medium, the method further comprising said providing information including indicating locations of the asperities on the surface of each one of the storage media, and said altering including altering relative movement between the transducers and the surfaces in response to the information.

20. The method of claim 19 wherein the storage media move by rotation and data are stored on circular tracks thereof, corresponding tracks of the storage media defining a cylinder, said providing information including indicating that a cylinder contains an asperity if any of the tracks thereof contain an asperity.

21. The method of claim 20 wherein said altering comprises altering the relative movement of the transducers in unison in response to the information to avoid an asperity in said cylinder.

22. The method of claim 1 further comprising storing said information in memory.

23. The method of claim 22 wherein said storing includes establishing a record for each of the asperities that indicates the location thereof.

24. The method of claim 23 wherein each of the records indicates the track on which the associated asperity is located.

25. The method of claim 24 wherein the tracks include a plurality of sectors, each of the records indicating the sector in which the associated asperity is located.

26. The method of claim 23 further comprising providing further information that indicates a characteristic of the asperities and storing said further information in the records therefor.

27. The method of claim 26 wherein the characteristic includes size.

28. A method of avoiding collisions between asperities on a surface of a moving data storage medium and a transducer that exchanges data signals with the storage medium and is movable over the surface during the movement of the storage medium, wherein data are stored on tracks of the storage medium, comprising:
- providing information that indicates locations of the asperities on the surface and further information that indicates a characteristic of the asperities, wherein the characteristic includes persistence;
- storing said information and further information in memory, wherein said storing includes establishing a record for each of the asperities that includes the location thereof and the further information therefor; and
- altering relative movement between the transducer and the surface in response to the information.

29. A method of avoiding collisions between asperities on a surface of a moving data storage medium and a transducer that exchanges data signals with the storage medium and is movable over the surface during the movement of the storage medium, wherein data are stored on tracks of the storage medium, comprising:
- providing information that indicates locations of the asperities on the surface and further information that indicates a characteristic of the asperities;
- storing said information and further information in memory, wherein said storing includes establishing a record for each of the asperities that includes the location thereof and the further information therefor;
- altering relative movement between the transducer and the surface in response to the information; and
- processing an output signal produced by the transducer in accordance with said further information.

30. A method of avoiding collisions between asperities on a surface of a moving data storage medium and a transducer that exchanges data signals with the storage medium and is movable over the surface during the movement of the storage medium, wherein data are stored on tracks of the storage medium, comprising:
- providing information that indicates locations of the asperities on the surface;
- storing said information in memory, wherein said storing includes establishing a record for each of the asperities that includes the location thereof;
- altering relative movement between the transducer and the surface in response to the information; and
- detecting whether a change has occurred in one of said asperities, and, if so, updating the corresponding record in accordance with the change.

31. The method of claim 30 wherein the change includes an appearance of a new asperity, said updating comprising creating a new record in the memory that indicates a location of the new asperity.

32. The method of claim 30 wherein the change includes a dissipation of a previously existing asperity, said updating including deleting the record that corresponded to the previously existing asperity.

33. The method of claim 30 wherein the detecting includes moving the transducer over the surface of the storage medium and determining the transducer collides with an asperity based on an output signal produced by the transducer.

34. Apparatus for avoiding collisions between asperities on a surface of a moving data storage medium and a transducer that exchanges data signals with the storage medium and is movable over the surface during the movement of the storage medium, wherein data are stored on tracks of the storage medium, comprising:
- storage for information that indicates locations of the asperities on the surface; and
- a processor for altering relative movement between the transducer and the surface in response to the information and for exchanging data signals between the transducer and one of the tracks while the information indicates an asperity is located on the one track.

35. The apparatus of claim 34 wherein the apparatus has an idle mode of operation in which the transducer does not exchange data signals with the storage medium, said processor positioning the transducer over a portion of the surface that does not include an asperity during the movement of the storage medium in the idle mode.

36. The apparatus of claim 35 wherein said information indicates a track on which an asperity is located, and said processor positions the transducer over a track other than the indicated track or a track nearby the indicated track.

37. Apparatus for avoiding collisions between asperities on a surface of a moving data storage medium and a transducer that exchanges data signals with the storage medium and is movable over the surface during the movement of the storage medium, wherein data are stored on tracks of the storage medium, comprising:
- storage for information that indicates locations of the asperities on the surface; and
- a processor for altering relative movement between the transducer and the surface in response to the information;
- wherein the apparatus has a data exchange mode of operation that includes moving the transducer to a position over one of the tracks, performing a data exchange operation between the transducer and storage locations on the one track as the storage medium moves, and thereafter moving the transducer away from the one track;
- said information indicating a track on which an asperity is located; and
- the processor being configured to, if the indicated track is said one track, move the transducer over the one track or away from the one track to avoid colliding with the asperity.

38. The apparatus of claim 37 wherein the processor is configured to move the transducer over the one track later than a nominal time before the data exchange operation is performed to avoid colliding with the asperity.

39. The apparatus of claim 37 wherein the processor is configured to move the transducer away from the one track earlier than a nominal time after the data exchange operation is performed to avoid colliding with the asperity.

40. The apparatus of claim 37 wherein the processor is configured to perform said altering differently if the data exchange operation is a read operation than if the data exchange operation is a write operation.

41. Apparatus for avoiding collisions between asperities on a surface of a moving data storage medium and a transducer that exchanges data signals with the storage medium and is movable over the surface during the movement of the storage medium, wherein data are stored on tracks of the storage medium, comprising:

storage for information that indicates locations of the asperities on the surface; and a processor for altering relative movement between the transducer and the surface in response to the information;

wherein the apparatus has a data exchange mode of operation that includes performing a data exchange operation between the transducer and storage locations on one of the tracks as the storage medium moves;

said information indicating a track on which an asperity is located; and said processor being configured to, if the indicated track is the one track or is nearby the one track, move the transducer away from the one track as the asperity approaches the transducer, and then return the transducer to the one track after the asperity passes the transducer.

42. The apparatus of claim 41 wherein the processor is configured to move the transducer sufficiently to cause a selected region of the transducer to miss the asperity.

43. The apparatus of claim 42 wherein the transducer includes a magnetoresistive element and adjacent magnet elements, the selected region comprising a width defined by the magnetoresistive element and the magnet elements.

44. Apparatus for avoiding collisions between asperities on a surface of a moving data storage medium and a transducer that exchanges data signals with the storage medium and is movable over the surface during the movement of the storage medium, wherein data are stored on tracks of the storage medium, comprising:

storage for information that indicates locations of the asperities on the surface; and a processor for altering relative movement between the transducer and the surface in response to the information;

wherein the apparatus has a seek mode of operation that includes moving the transducer from a position over a first one of the tracks along a selected trajectory to a position over a second one of the tracks as the storage medium moves;

said information indicating a track on which an asperity is located; and said processor being configured to, if the indicated track is one that will be encountered by the transducer during the seek, change the trajectory of the transducer from the selected trajectory to avoid colliding with the asperity on the indicated track, wherein the processor is configured to change the trajectory by moving the transducer faster or slower than normal between the first and second tracks.

45. The apparatus of claim 44 wherein the processor is configured to change the trajectory by moving the transducer faster than normal between the first and second tracks.

46. The apparatus of claim 44 wherein the processor is configured to, if the indicated track is between the first and second tracks, change the trajectory so that the transducer avoids the asperity as it crosses the indicated track.

47. The apparatus of claim 44 wherein the processor is configured to, if the indicated track is the second track, change the trajectory so that the transducer arrives at the second track later than normal to avoid the asperity.

48. The apparatus of claim 34 wherein the data storage medium moves by rotation.

49. The apparatus of claim 34 wherein the data storage medium is a magnetic storage medium and the transducer is a magnetic device.

50. The apparatus of claim 34 wherein the data storage medium is an optical storage medium and the transducer is a near field optical device.

51. The apparatus of claim 34 wherein the data storage medium has a second said surface and a second said transducer associated therewith, said information indicating locations of the asperities on the second surface, and said processor being configured to alter relative movement between the second transducer and the second surface in response to the information.

52. The apparatus of claim 34 further comprising a plurality of moving storage media each of which has associated therewith a said transducer that exchanges data signals therewith and is movable with respect to the surface during the movement of the storage medium, said information indicating locations of the asperities on the surface of each one of the storage media, and said processor being configured to alter relative movement between the transducers and the surfaces in response to the information.

53. The apparatus of claim 52 wherein the storage media move by rotation and data are stored on circular tracks thereof, corresponding tracks of the storage media defining a cylinder, said information indicating that a cylinder contains an asperity if any of the tracks thereof contain an asperity.

54. The apparatus of claim 53 wherein the processor is configured to alter the relative movement of the transducers in unison in response to the information to avoid an asperity in said cylinder.

55. The apparatus of claim 34 further comprising a memory in which said information is stored.

56. The apparatus of claim 55 wherein the memory includes a record for each of the asperities that indicates the location thereof.

57. The apparatus of claim 56 wherein each of the records indicates the track on which the associated asperity is located.

58. The apparatus of claim 57 wherein the tracks include a plurality of sectors, each of the records indicating the sector in which the associated asperity is located.

59. The apparatus of claim 56 wherein each record stores further information that indicates a characteristic of the corresponding asperity.

60. The apparatus of claim 59 wherein the characteristic includes size.

61. Apparatus for avoiding collisions between asperities on a surface of a moving data storage medium and a transducer that exchanges data signals with the storage medium and is movable over the surface during the movement of the storage medium, wherein data are stored on tracks of the storage medium, comprising:

a memory for storage for information that indicates locations of the asperities on the surface, wherein the memory includes a record for each of the asperities that indicates the location thereof, each record stores further information that indicates a characteristic of the corresponding asperity, and the characteristic includes persistence; and a processor for altering relative movement between the transducer and the surface in response to the information.

62. Apparatus for avoiding collisions between asperities on a surface of a moving data storage medium and a transducer that exchanges data signals with the storage medium and is movable over the surface during the movement of the storage medium, wherein data are stored on tracks of the storage medium, comprising:

a memory for storage for information that indicates locations of the asperities on the surface, wherein the memory includes a record for each of the asperities that indicates the location thereof, and each record stores further information that indicates a characteristic of the corresponding asperity;

a processor for altering relative movement between the transducer and the surface in response to the information; and a signal processor for processing an output signal produced by the transducer in accordance with said further information.

63. Apparatus for avoiding collisions between asperities on a surface of a moving data storage medium and a transducer that exchanges data signals with the storage medium and is movable over the surface during the movement of the storage medium, wherein data are stored on tracks of the storage medium, comprising:

a memory for storage for information that indicates locations of the asperities on the surface, wherein the memory includes a record for each of the asperities that indicates the location thereof, a processor for altering relative movement between the transducer and the surface in response to the information; and a detector for detecting whether a change has occurred in one of said asperities, said processor being configured to update the corresponding record in accordance with the detected change.

64. The apparatus of claim 63 wherein the change includes an appearance of a new asperity, said processor being configured to create a new record in the memory that indicates a location of the new asperity.

65. The apparatus of claim 63 wherein the change includes a dissipation of a previously existing asperity, said processor being configured to delete the record that corresponded to the previously existing asperity.

66. The apparatus of claim 63 wherein the processor is configured to move the transducer over the surface of the storage medium and determine that the transducer collides with an asperity based on an output signal produced by the transducer and detected by said detector.

* * * * *